E. S. G. LEWIS.
SHEARS.
APPLICATION FILED NOV. 30, 1909.
981,436.
Patented Jan. 10, 1911.
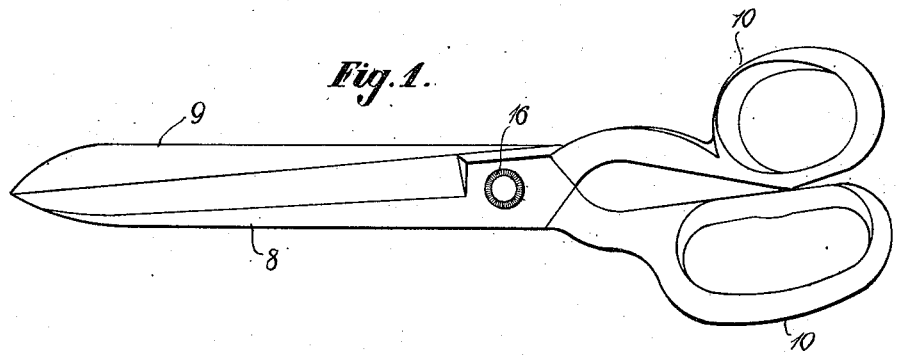
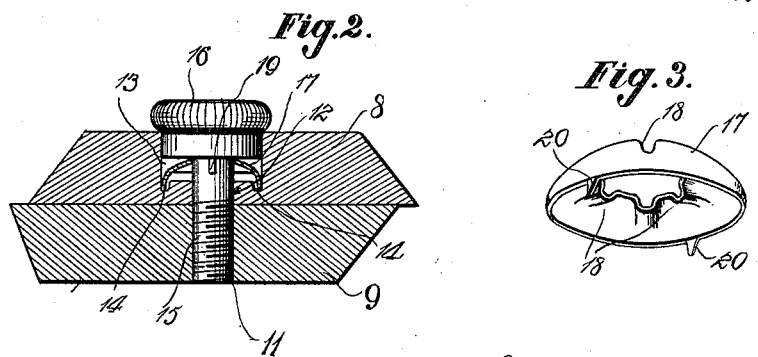
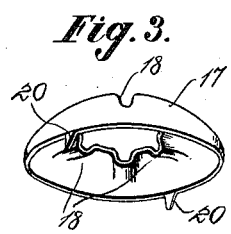
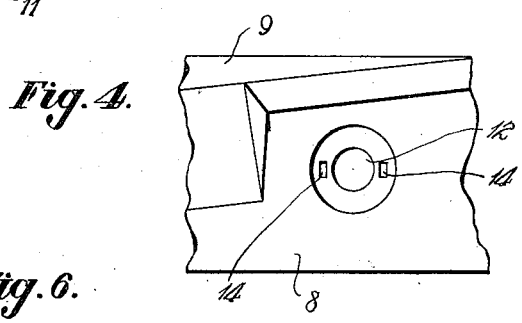
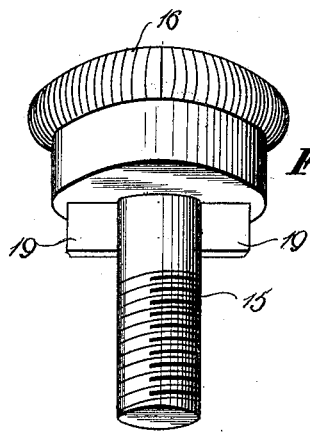
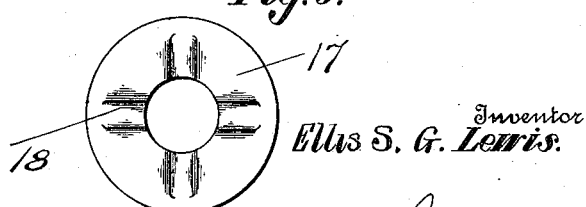

UNITED STATES PATENT OFFICE.

ELLIS S. G. LEWIS, OF WIGGINS, MISSISSIPPI.

SHEARS.

981,436.　　　　　Specification of Letters Patent.　　Patented Jan. 10, 1911.

Application filed November 30, 1909.　Serial No. 530,603.

*To all whom it may concern:*

Be it known that I, ELLIS S. G. LEWIS, a citizen of the United States, residing at Wiggins, in the county of Harrison, State of Mississippi, have invented certain new and useful Improvements in Shears; and I do hereby declare the following to be a full, clear, and exact description of the invention, such as will enable others skilled in the art to which it appertains to make and use the same.

The invention relates to shears or scissors and more particularly to the class of joints for shears, scissors or the like.

The primary object of the invention is the provision of a joint of this character in which the blades of shears will be maintained in close relation to each other so as to effect the proper cutting action thereby and that will enable the said blades to be maintained under tension to insure the proper operation of the shears.

Another object of the invention is the provision of a joint of this character that will enable the ready and quick adjustment of the blades of shears, scissors or the like, and which blades will be maintained in such adjustment to insure usefulness of the implement.

A further object of the invention is the provision of a joint of this character which contemplates an improved construction that in addition to capabilities in the direction of perfect adjustment of the blades it possesses durability and also enables the said blades to be maintained under tension.

A still further object of the invention is the provision of a joint of this character which is simple in construction, thoroughly reliable and efficient in operation, and inexpensive in the manufacture.

With these and other objects in view, the invention consists in the construction, combination and arrangement of parts, as will be hereinafter more fully described, illustrated in the accompanying drawings, and pointed out in the claim hereunto appended.

In the drawings:—Figure 1 is a plan view of a shears or scissors with the invention applied thereto. Fig. 2 is a transverse sectional view through the blades of the shears or scissors at the point of the joint, and being shown on an enlarged scale. Fig. 3 is a detail perspective view on an enlarged scale of the resilient saucer-shaped washer. Fig. 4 is an enlarged fragmentary plan view of one blade of the implement showing the counterbore therein. Fig. 5 is a top plan view of the resilient washer. Fig. 6 is a perspective view of the adjustable bolt member.

Similar reference characters indicate corresponding parts throughout the several views in the drawings.

Referring to the drawings by numerals 8 and 9 designate the shears or scissors members forming the cutting blades which may be of the usual construction terminating in handles 10, and the member 9, is provided with a central circular transverse threaded opening 11, registering with an opening 12, contained in the blade 8, and this opening intersects a counterbore 13, opening through the outer face of the said member 8. Within the counterbore 13 and contained in the bottom thereof are diametrically opposed recesses 14, the purpose of which and likewise the counterbore 13, will be hereinafter more fully described.

Passed through the counterbore 13, and the intersecting opening 12, in the member 8, is a bolt member 15, the latter being threaded into the threaded opening 11, in the member 9, and this bolt member 15, is formed with a knurled head 16, to enable the same to be adjusted at will.

Disposed within the counterbore 13, in the member 8, below the head 16, of the bolt member is a resilient washer, 17, of substantially saucer shape so as to present an outwardly bulged surface and this washer 17, is formed with radially disposed alining pairs of indentations or grooves 18, in its upper surface and projecting from the under face of the head 16, of the bolt member are alining fins or wings 19, the same being adapted to engage in either pair of the indentations or grooves 18, in the resilient washer to lock the said bolt member with the washer. This washer 17, is formed on its periphery at diametrically opposite points with projecting spurs or lugs 20, the same being adapted to engage in the recesses 14, to lock the said washer with the member 8, and against turning movement in the counterbore therein when the latter member and the member 9, are being moved toward or away from each other during the cutting operation thereof.

It will be noted that when the members 8 and 9 are moved to separate the same from each other the threaded portion of the bolt member 15, will be slightly unscrewed from the threaded aperture 11, in the member 9, but by the action of the resilient washer 17, in the counterbore 13, it will exert an outward pressure upon the head 16, of the bolt member and in this manner the member 8, will be constantly maintained in close contact with the member 9. It is obvious that upon adjustment of the bolt member 15, the tension of the resilient washer 17, can be increased or decreased to vary the contact relation between the members 8 and 9, should it be desired.

What is claimed is:—

A joint for members of shears, scissors or the like, comprising a bolt member adjustably threaded in one member and having wings, and a resilient washer having spurs securing it to the other member and also having recesses receiving the wings on the bolt member whereby the members will be tensioned during opening and closing movement thereof.

In testimony whereof, I affix my signature, in presence of two witnesses.

ELLIS S. G. LEWIS.

Witnesses:
HARRY H. LEWIS,
W. W. BURNETT.